United States Patent
Tahvili et al.

(10) Patent No.: US 12,278,751 B2
(45) Date of Patent: Apr. 15, 2025

(54) TEST SCRIPT GENERATION FROM TEST SPECIFICATIONS USING NATURAL LANGUAGE PROCESSING

(71) Applicant: Telefonaktiebolaget LM Ericsson (publ), Stockholm (SE)

(72) Inventors: Sahar Tahvili, Upplands Väsby (SE); Alzahraa Salman, Skärholmen (SE); Cristina Landin, Kumla (SE); Vincent Huang, Sollentuna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 81 days.

(21) Appl. No.: 18/020,127

(22) PCT Filed: Aug. 7, 2020

(86) PCT No.: PCT/EP2020/072324
§ 371 (c)(1),
(2) Date: Feb. 7, 2023

(87) PCT Pub. No.: WO2022/028721
PCT Pub. Date: Feb. 10, 2022

(65) Prior Publication Data
US 2023/0308381 A1    Sep. 28, 2023

(51) Int. Cl.
*G06F 11/36* (2006.01)
*G06F 11/3668* (2025.01)
(Continued)

(52) U.S. Cl.
CPC .......... *H04L 43/50* (2013.01); *G06F 11/3664* (2013.01); *G06F 11/3684* (2013.01); *H04L 41/16* (2013.01); *H04W 24/00* (2013.01)

(58) Field of Classification Search
None
See application file for complete search history.

(56) References Cited

U.S. PATENT DOCUMENTS 9,047,414 B1 * 6/2015 Matyjek .............. G06F 11/3692
9,152,623 B2   10/2015 Wroczyński et al.
(Continued)

FOREIGN PATENT DOCUMENTS

CN    107832229 A    3/2018

OTHER PUBLICATIONS

International Search Report and Written Opinion of the International Searching Authority, PCT/EP2020/072324, mailed May 3, 2021, 13 pages.
(Continued)

*Primary Examiner* — Jason D Mitchell
(74) *Attorney, Agent, or Firm* — Sage Patent Group

(57) ABSTRACT

A method of testing a network node in a communication system according to some embodiments includes obtaining a test case specification that describes a test scenario associated with the network node and extracting textual features from the test case specification. A feature vector is generated that includes the extracted textual features, and the feature vector is mapped to a plurality of available test scripts. The method selects one or more of the plurality of available test scripts for execution in response to the mapping of the feature vector. For one or more of the selected test scripts the method generates a confidence score that measures a confidence of an association of the test case specification with the selected test script. Related systems are disclosed.

20 Claims, 8 Drawing Sheets

(51) Int. Cl.
  *H04L 41/16* (2022.01)
  *H04L 43/50* (2022.01)
  *H04W 24/00* (2009.01)

(56) References Cited

U.S. PATENT DOCUMENTS

| | | | |
|---|---|---|---|
| 10,509,718 | B2 | 12/2019 | Venkatasubramanian et al. |
| 10,789,943 | B1* | 9/2020 | Lapshina ............ G10L 15/1815 |
| 11,102,081 | B1* | 8/2021 | Tiwari .................... H04L 67/51 |
| 11,200,539 | B2* | 12/2021 | Iyer .................... G06Q 10/0633 |
| 11,282,042 | B2* | 3/2022 | Bhattacharya ......... G06N 20/00 |
| 11,516,158 | B1* | 11/2022 | Luzhnica ................ G06F 40/35 |
| 2007/0028220 | A1* | 2/2007 | Miller .................. G06F 18/2137 717/124 |
| 2008/0127043 | A1* | 5/2008 | Zhou ................... G06F 11/3604 717/124 |
| 2014/0026123 | A1* | 1/2014 | Dhanapal ............ G06F 11/3664 717/124 |
| 2016/0179659 | A1* | 6/2016 | Champlin-Scharff ...................... G06F 40/211 717/126 |
| 2017/0244862 | A1* | 8/2017 | Nishizawa ........... H04N 1/4072 |
| 2017/0364797 | A1* | 12/2017 | Pal ........................... G06N 3/08 |
| 2019/0354768 | A1* | 11/2019 | Wang ....................... H04N 7/18 |
| 2020/0019492 | A1 | 1/2020 | Fei et al. |
| 2020/0074991 | A1* | 3/2020 | Yalla ..................... G06F 40/268 |
| 2020/0183813 | A1* | 6/2020 | Sudhakaram ......... G06F 40/268 |
| 2020/0210524 | A1* | 7/2020 | Yang ....................... G06F 40/30 |
| 2020/0279105 | A1* | 9/2020 | Muffat ..................... G06N 3/08 |
| 2021/0281492 | A1* | 9/2021 | Di Pietro ............... G06N 5/022 |
| 2022/0156175 | A1* | 5/2022 | Periyathambi .......... G06F 40/20 |
| 2023/0081333 | A1* | 3/2023 | Menon .................... H04L 43/12 370/242 |
| 2024/0241817 | A1* | 7/2024 | Tahvili ................. G06F 40/216 |

OTHER PUBLICATIONS

Anonymous, "AI-Driven Automated Testing Tool for Continuous Testing", Testsigma (downloaded from https://testsigma.com/ai-driven-test-automation) 3 pages.

Anonymous, "How NLP Will Drive the Future of Software Testing", Functionize, Oct. 29, 2018, 6 pages.

Anonymous, "Natural Language Processing (NLP) Based Test Automation", Next Generation Automation.com, 4 pages.

C. Bischke et al., "An Intelligent Tester: Automated Test Generation and Test Execution through Machine Learning and Natural Language Processing" 7 pages.

C. D. Manning et al., "An Introduction to Information Retrieval", Apr. 1, 2009, Cambridge University Press, Cambridge, UK, XP007919921, 569 pages.

C. Wang et al., "Automatic Generation of Acceptance Test Cases from Use Case Specifications: an NLP-based Approach", arXiv.org, Jul. 19, 2019, No. arXiv: 1907-08490v1, 27 pages.

G. Carvalho et al., "NAT2TESTscr: Test case generation from natural language requirements based on SCR specifications", Science of Computer Programming, 2014, pp. 275-297, vol. 95, Elsevier, 23 pages.

G. Shenk, "Natural Language Processing: The Future of Test Creation", Functionize.com, Sep. 4, 2018, 6 pages.

I Ashan et al., "A Comprehensive Investigation of Natural Language Processing Techniques and Tools to Generate Automated Test Cases", Proceedings of the Second International Conference on Internet of things, Data and Cloud Computing, Mar. 2017, Article No. 132, 10 pages.

K. Toutanove et al., "Enriching the Knowledge Sources Used in a Maximum Entropy Part-of-Speech Tagger", Joint SIGDAT Conference on Empirical Methods in NLP and Very Large Corpora (EMNLP/VLC-2000), Oct. 7-8, 2000, , pp. 63-70, Hong Kong, 8 pages.

M. Saravanan et al., "Dimensioning and Optimizing TaaS for Improved Performance in Telecom System with Text Analytics Features", Data 2016—Proceedings of 5th International Conference on Data Management Technologies and Applications, Jul. 24-26, 2016, pp. 182-188, SciTePress, Lisbon, Portugal, 6 pages.

R. Boddu et al., "RETNA: From Requirements to Testing in a Natural Way", Proceedings of the 12th IEEE International Requirements Engineering Conference, 2004, 10 pages.

R. P. Verma et al., "Generation of Test Cases from Software Requirements Using Natural Language Processing", 2013 6th International Conference on Engineering Trends in Engineering and Technology, 2013, pp. 140-147, IEEE Computer Society, 8 pages.

S. Nogueira et al., "Automatic generation of test cases and test purposes from natural language", Cornélio M., Roscoe B. (eds) Formal Methods: Foundations and Applications. SBMF 2015, Lecture Notes in Computer Science, Jan. 24, 2016, pp. 68-83, vol. 9526, 74 pages.

S. Tahvili et al., "ESPRET: A tool for execution time estimation of manual test cases", The Journal of Systems and Software, 2018, pp. 26-41, vol. 146, Elsevier, 16 pages.

S. Tahvili, "Multi-Criteria Optimization of System Integration Testing", Mälardalen University Doctoral Dissertation 281, 2018, 69 pages.

V. Garousi et al., "NLP-assisted software testing: A systematic mapping of the literature", arXiv.org, Mar. 21, 2020, pp. 1-26, No. arXiv:1806.00696v3, 29 pages.

* cited by examiner

TEST SCRIPT GENERATION FROM TEST SPECIFICATIONS USING NATURAL LANGUAGE PROCESSING

CROSS REFERENCE TO RELATED APPLICATIONS

This application is a 35 U.S.C. § 371 national stage application of PCT International Application No. PCT/EP2020/072324 filed on Aug. 7, 2020, the disclosure and content of which is incorporated by reference herein in its entirety.

FIELD

The present disclosure relates to communication systems, and in particular, to systems and methods for testing communication systems.

BACKGROUND

A simplified wireless communication system 20 is illustrated in FIG. 1. The system 20 includes a user equipment (UE) 10 that communicates with one or more access nodes 21, 22 using radio connections comprising component carriers 17P, 17S, 18. The access nodes 21, 22 are connected to a core network node 16. The access nodes 21-22 are part of a radio access network 15. As shown in FIG. 1, a UE 10 can be configured via carrier aggregation to communicate over multiple component carriers 17P, 17S to/from a single access node 21.

For wireless communication systems pursuant to 3GPP Evolved Packet System, EPS (also referred to as Long Term Evolution, LTE, or 4G) standard specifications, the access nodes 21, 22 correspond typically to an Evolved NodeB (eNB) and the core network node 16 corresponds typically to either a Mobility Management Entity (MME) and/or a Serving Gateway (SGW). The eNB is part of the radio access network 15, which in this case is the E-UTRAN (Evolved Universal Terrestrial Radio Access Network), while the MME and SGW are both part of the EPC (Evolved Packet Core network).

For wireless communication systems pursuant to 3GPP 5G System, 5GS (also referred to as New Radio, NR, or 5G) standard specifications, the access nodes 21-22 correspond typically to a 5G NodeB (gNB) and the core network node 16 corresponds typically to either an Access and Mobility Management Function (AMF) and/or a User Plane Function (UPF). The gNB is part of the radio access network 15, which in this case is the NG-RAN (Next Generation Radio Access Network), while the AMF and UPF are both part of the 5G Core Network (5GC).

The 5G System consists of the access network and the core network. The Access Network (AN) is the network that allows the UE to gain connectivity to the Core Network (CN), e.g. the base station which could be a gNB or an ng-eNB in 5G. The CN contains all the Network Functions (NF) ensuring a wide range of different functionalities such as session management, connection management, charging, authentication, etc.

Communication systems, such as the wireless communication system 20 shown in FIG. 1, operate using computerized networks and devices that execute complex software to control every aspect of their operation. In that regard, software testing plays a crucial role in software engineering for communication systems. Software testing helps to ensure the reliability and quality of a software system which directly affects the quality of the end product and, ultimately, the quality of the experience of users of the communication system.

Software testing is both costly and time-consuming. In the context of communication networks, software testing involves designing and creating appropriate test cases that aim to verify and validate the operation of a computerized system or device. Each test case is designed to investigate a specific feature or function of a system or device. Because of the complexity of communication devices and systems, and the complexity of the software needed to operate them, many test cases may be needed to test a single device or system. Test case generation is considered to be one of the most difficult and time-consuming stages of the software testing life cycle (STLC). In fact, test case generation has been estimated to consume between 40% and 70% of the total SLTC effort.

Previously, one of the most common ways of generating test cases has been through manual labor. In a manual approach, a group of testers analyze and execute a set of test case specifications. Test case specification documents describe the functions of the software that are to be tested manually. The test case specification may describe functions of the communication system or device to be tested, along with test conditions and performance/evaluation criteria.

By automating the generation of test cases, manual efforts can be eliminated, which can lead to time and cost reductions.

C. Wang et al. "Automatic Generation of System Test Cases from Use Case Specifications: an NLP-based Approach" (In:arXiv preprintarXiv:1907.08490(2019)) describes an approach that generates executable system test cases for acceptance testing by exploiting behavioral information in use case specifications.

SUMMARY

A method of testing a network node in a communication system according to some embodiments includes obtaining a test case specification that describes a test scenario associated with the network node. The communication system may be a wireless communication system or other type of communication system. The test case specification may be written in a natural language, such as English. The method extracts textual features from the test case specification. Extracting the textual features from the test script may include splitting the test case specification into a set of specification words, performing part of speech tagging on the words in the set of specification words, and removing stop words from the set of specification words.

The method generates a feature vector comprising the extracted textual features from the test case specification, and maps the feature vector to a plurality of available test scripts. Generating the feature vector may include selecting all verbs from the set of specification words and selecting all nouns and adjectives from the set of specification words that satisfy a selection criterion. The selection criterion may include a frequency of appearance within the set of specification words.

In some embodiments, the method may generate a plurality of augmented feature vectors from the feature vector, wherein the plurality of augmented feature vectors are generated as subsets of the feature vector, and training a classifier that is used to map the feature vector to the plurality of available test scripts using the plurality of augmented feature vectors.

Mapping the feature vector to the plurality of available test scripts may be performed by generating a label vector for each of the plurality of available test scripts and classifying the label vector using a text classifier. The label vector for each of the plurality of available test scripts may be obtained by generating, for each test script in the plurality of available test scripts, a vector of terms in the test script.

The method selects one or more of the plurality of available test scripts for execution in response to the mapping of the feature vector. For one or more of the selected test scripts the method generates a confidence score that measures a confidence of an association of the test case specification with the selected test script.

In some embodiments, the method may generate a prediction score associated with each of the plurality of available test scripts. The selection of one or more of the plurality of available test scripts for execution in response to the mapping of the feature vector may be performed based on the prediction score. The selection of the one or more of the plurality of available test scripts for execution in response to the mapping of the feature vector may be performed based on whether an associated prediction score is greater than a threshold value.

The confidence score for each of the selected test scripts may be generated based on the prediction score associated with each of the selected test scripts.

In some embodiments, the confidence score for each of the selected test scripts may be generated based on how close the prediction scores for the selected test script is to the threshold value in a normal distribution fashion.

In some embodiments, the method outputs an identification of the selected test scripts and associated confidence scores via a user interface. In some embodiments the method includes receiving a user input in response to outputting the identification of the selected test scripts and executing the selected test scripts in response to the user inputs.

A system for testing a network node in a communication system according to some embodiments includes a processor circuit and a memory coupled to the processor circuit. The memory includes computer program instructions that, when executed by the processor circuit cause the system to perform operations of obtaining a test case specification that describes a test scenario associated with the network node. The system is further caused to extract textual features from the test case specification. The system is further caused to generate a feature vector comprising the extracted textual features from the test case specification. The system is further caused to map the feature vector to a plurality of available test scripts. The system is further caused to select one or more of the plurality of available test scripts for execution in response to the mapping of the feature vector, and for one or more of the selected test scripts. The system is further caused to generate a confidence score that measures a confidence of an association of the test case specification with the selected test script.

A system according to some embodiments for testing a network node in a communication system is configured to obtain a test case specification that describes a test scenario associated with the network node. The system is further configured to extract textual features from the test case specification. The system is further configured to generate a feature vector comprising the extracted textual features from the test case specification. The system is further configured to map the feature vector to a plurality of available test scripts. The system is further configured to select one or more of the plurality of available test scripts for execution in response to the mapping of the feature vector, and for one or more of the selected test scripts, generate a confidence score that measures a confidence of an association of the test case specification with the selected test script.

Some embodiments may provide accurate selection of relevant test scripts given a non-formal test case specification written in natural language. By automatically analyzing test case specifications using NLP, some embodiments may reduce/eliminate some of the manual work associated with software testing. Because the test case specifications may be written in natural language, formal test specifications may not be required.

DETAILED DESCRIPTION

Figure 1:
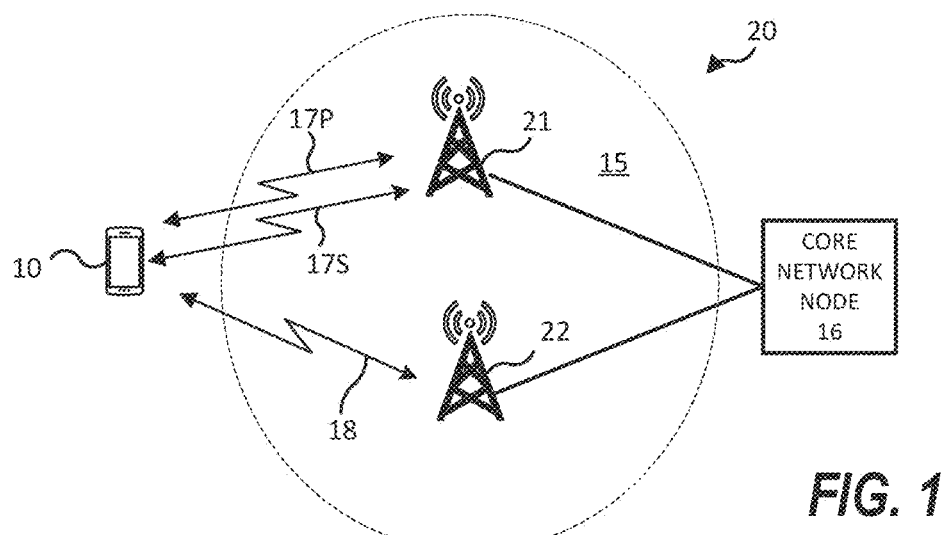
FIG. 1 illustrates a simplified wireless communication system.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Embodiments described herein provide systems/methods for selecting test scripts for testing communication systems/devices using natural language processing (NLP) based on test specifications written in natural language as opposed to formalized test specifications. In particular, some embodiments apply artificial intelligence (AI) to automatically select/generate test scripts written in a high-level computer programming language, such as C# or Java™, given only a test case specification written in a non-formal natural language, such as English. Some embodiments described herein may be implemented in the Python programming language as a system that reads test case specifications written in natural language provided by testers as input and provides the corresponding code for fulfilling the test specification.

Typically, to generate test scripts for testing communication systems/devices, a test engineer reads a test specification or a requirements specification and manually generates program code, such as C# or Java™ code, that performs a test according to the test specification. This process is both time consuming and subject to human judgment, uncertainty, and ambiguity.

Often, when testing communication systems/devices, an existing library of test scripts exists for testing prior versions of the systems/devices. That is, a test specification may describe test steps or test activities that can be mapped to existing test scripts from previous or similar products. Even if such a library is available, however, selecting an appropriate test script based on the test specification requires significant knowledge of the systems/devices being tested and of the library of test scripts. Moreover, it may be difficult to adapt such knowledge for testing a new product.

In the context of communication systems, the number of test cases that are needed to test products is very large. Automatically selecting/generating test scripts (in the form of C# or Java™ code) can lead to time and resource-savings.

Methods for automating the generation of test scripts typically require the use of formal test specifications. In such approaches, requirements specifications written in natural language must be translated into formal models that can be used for test case generation. In contrast, some embodiments described herein automatically select test cases based on test case specifications that are written in a natural language, such as English. Moreover, the selected test scripts may be capable of being executed directly without the need to write the code manually. Thus, some embodiments described herein may not require the use of code generation tools, such as QTP and SELENIUM.

Some embodiments described herein produce test scripts for integration test cases, which test interfacing between inter-connected components, as opposed to system test cases which test an entire system. Integration testing of communication systems/devices may be particularly suitable for a system/method that selects existing test scripts for execution from a library of test scripts based on a test case specification, because there may be a need to test an interface every time a software version of any of the interconnected components changes.

Some embodiments described herein use natural language processing to analyze test case specifications. The systems/methods described herein may not use a predefined set of words, but rather extract all verbs from a test specification along with all nouns and adjectives that meet a predetermined criterion, such as appearing at least two times in the test specification. In particular, some embodiments use syntactic analysis to extract an unordered list of keywords (features) that collectively characterize the test case specification.

To identify words for extraction, part-of-speech (POS) tagging is used to identify the part of speech of each word. In particular, some embodiments use POS-tagging for all statements in the specification, not only the "testable" parts of the specification. There are various options for POS-tagging. For example, some approaches use the natural language toolkit (NLTK) POS-tagger. However, the NLTK POS-tagger is not always able to parse all the words in a sentence correctly based on the positions of the component in the sentence. For example, if a sentence starts with a verb, such as "Check temperature . . . ", the NLTK tagger may identify the verb, "Check", as a noun. To overcome this issue, some embodiments described herein may use the Stanford POS-tagger, which has been trained with more imperative sentences compared to the default NLTK tagger and which has been observed to yield better results.

Some embodiments provide a confidence score percentage which tells a user how confident the tool is that a selected test script is matched to the test case specification.

Some embodiments described herein may provide certain advantages. For example, some embodiments may provide accurate selection of relevant test scripts given a non-formal test case specification written in natural language. By automatically analyzing test case specifications using NLP, some embodiments may reduce/eliminate some of the manual work associated with software testing. Because the test case specifications may be written in natural language, formal test specifications may not be required. Some embodiments produce test scripts containing the actual high-level program code that is needed to run the test case described in the test case specification. Moreover, some embodiments provide a confidence score percentage that tells the user how confident the tool is that the suggested test script is matched to the given test case specification. A user can use the confidence score as a trigger to evaluate whether the test script is appropriate as written or should be modified before use.

Figure 2:
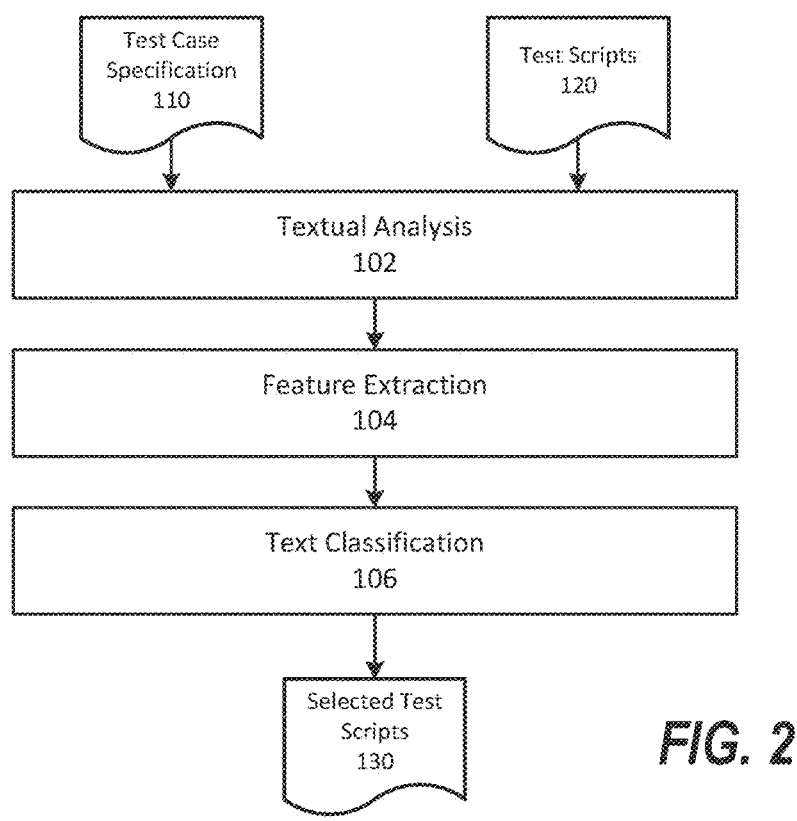
FIGS. 2 to 4 are flowcharts of operations of systems/methods for automatically selecting test cases for testing communication systems/devices according to some embodiments.

FIG. 2 is a flowchart that provides a general overview of the systems/methods for automatically selecting test cases for testing communication systems/devices according to some embodiments. Referring to FIG. 2, a test case specification 110 is obtained or provided. The test case specification provides a natural language test description of a functional test to be performed on a communication system/device, such as a network node. A library 120 of test scripts is also provided/obtained. The test scripts are programs written in a high-level computer programming language, such as C# or Java™, that can be used or modified to test various functions of the communication system/device.

At block 102, the systems/methods perform textual analysis on the test case specification to identify potential key words in the test case specification. Next, at block 104, the systems/methods perform feature extraction to extract features from the test case specification and generate feature vectors from the extracted features. As described in more detail below, the feature vectors may be augmented to provide additional feature vectors for training a machine learning classification model in a training phase.

Next, at block 106, text classification is performed using a machine learning (ML) classification model to select one or more executable test scripts 130 from the library 120 of test scripts based on the feature vectors. The systems methods may provide a confidence score percentage for each selected test script. Moreover, some embodiments may automatically execute selected test cases for the network node.

Figure 3:
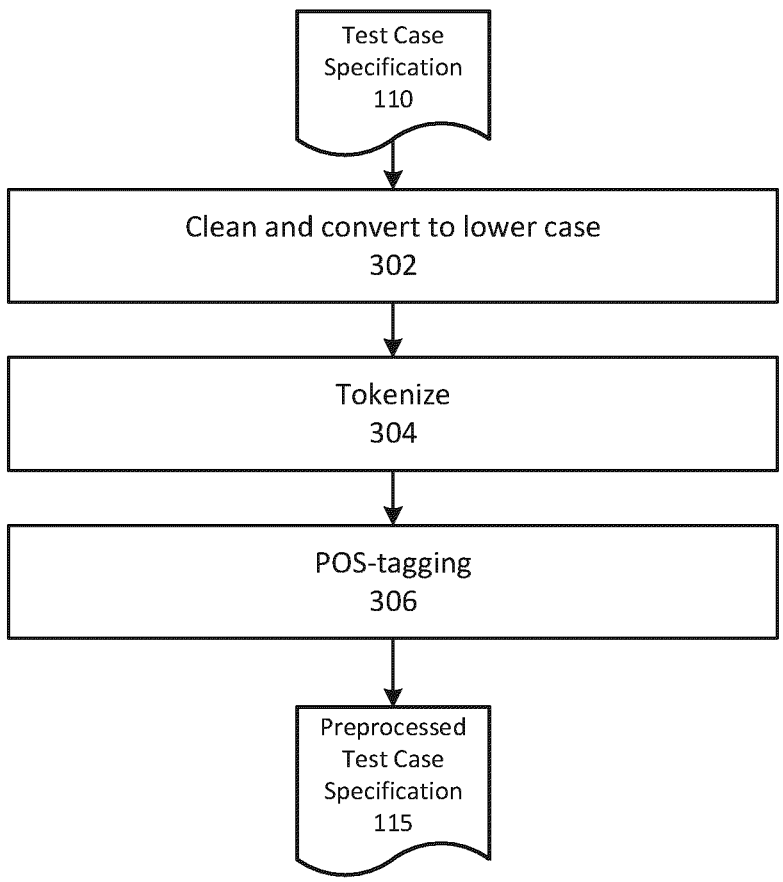

The textual analysis operations performed in block 102 are illustrated in more detail in FIG. 3, which is a flowchart of systems/methods that receive the test case specification 110 and generate a preprocessed test case specification 115 as output. The NLTK Python programming library may be used to perform the preprocessing steps. Each test case specification may contain sections that describe aspects of the test, such as Purpose, Configuration, Procedure, and Pass Criteria. These sections contain important words that can act as features describing a test case specification.

Referring to FIG. 3, the process begins at block 302 by cleaning the text of each test case specification document by removing all punctuation and converting all words to lower case, because the Python NLTK is case sensitive. At block 304, the text of the test case specification is then divided into word tokens by splitting by white spaces using NLTK tokenization. At block 306, the word tokens are fed as input to a POS-tagger, such as the Stanford POS-tagger, which assigns a part of speech to each token. Finally, stop words, which are high-frequency words with low semantic content, such as 'the' or 'is', are removed to reduce/minimize the noise in the data. The output of the operations is a preprocessed test case specification 115.

Figure 4:
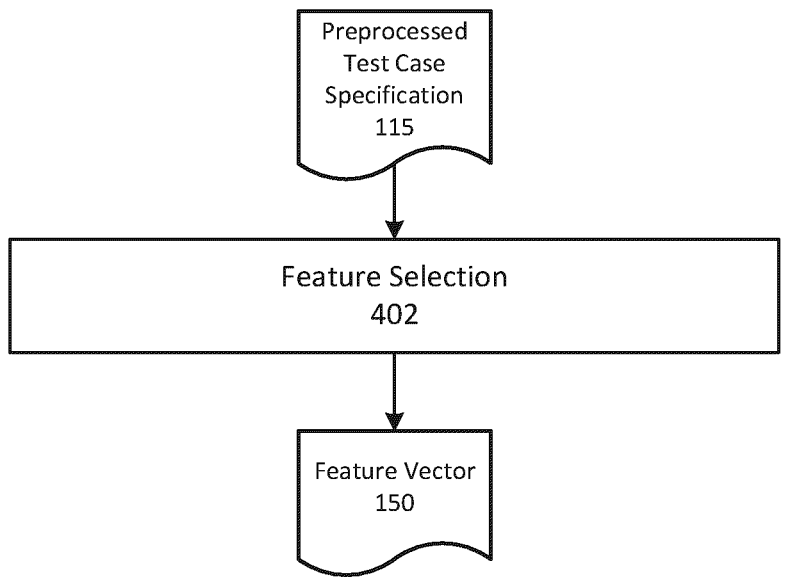

The feature extraction step of block 104 is illustrated in more detail in FIG. 4. At block 402, the preprocessed test case specification 115 is input. The preprocessed test case specification 115 is analyzed using feature selection to generate a feature vector corresponding to the preprocessed test case specification 115. To derive a feature vector from a test case specification, a rule-based heuristic including a bag-of-words model may be used in some embodiments. It will be appreciated, however, that other feature selection algorithms could be employed.

In some embodiments, all verbs in a test case specification may be collected as features, because the verbs may provide important semantic cues regarding the test case described in the test case specification. Since the number of verbs in each specification might be low, only selecting verbs for inclusion in the feature vector may result in a short feature vector that may not be sufficiently descriptive of the test case specification. However, nouns and adjectives that appear infrequently in the test case specification may be irrelevant or misleading.

Accordingly, in some embodiments, only those nouns and adjectives that meet a selection criterion may be included in the feature vector. The selection criterion for nouns and adjectives may be based on the frequency of occurrence of such word tokens in the test case specification. In particular, the frequency of each word token may be calculated using a bag-of-words model, and for a noun or an adjective to be added to the feature vector, the token would have to appear at least a threshold number of times in the specification. In some cases, the threshold number may be two. Thus, only those nouns and verbs that occur at least twice in the test case specification may be included in the feature vector.

The output of the feature selection step 402 is a feature vector 150 associated with the test case specification 110. The feature vector 150 consists of a list of word tokens selected as features, e.g., ['time', 'calculate', 'voltage', . . . , 'power', 'attenuation'].

Figure 5:
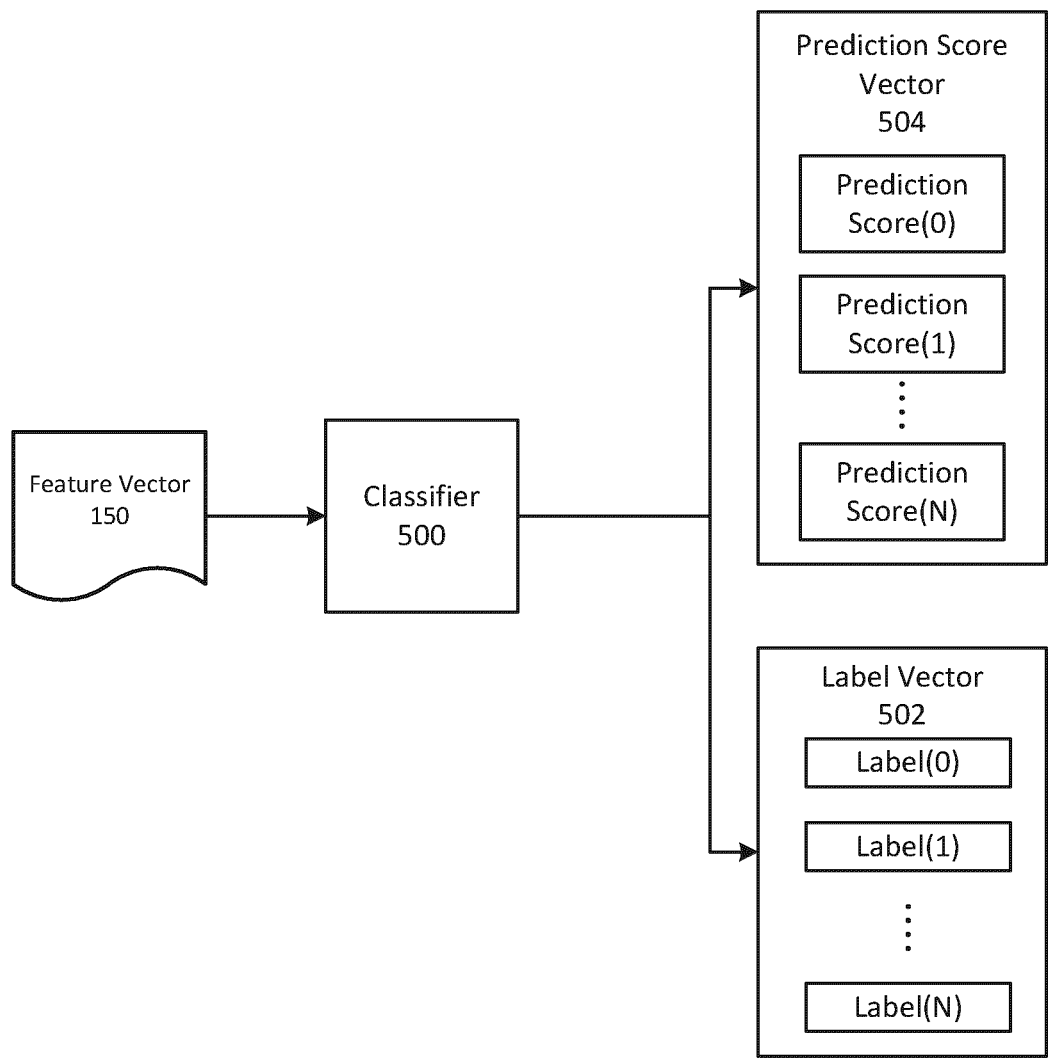
FIG. 5 illustrates operations of a machine learning classification system for classifying feature vectors according to some embodiments.

The text classification operation of block 106 of FIG. 2 is illustrated in more detail in FIG. 5. As shown in FIG. 5, the feature vector 150 is input to a classifier 500 that performs multi-label classification of the feature vector 150 relative to elements of a label vector 502 using a one-versus-all (OVA) strategy, where each element of the label vector 502 corresponds to an available test script in the library of test scripts 120.

In some embodiments, the label vector 502 consists of the names of each test script that are relevant for the test case specification in question, because the names are unique and may be readily used as identifiers to identify the test scripts. However, in some embodiments, other identifiers may be used to identify the test scripts. For example, the label vector elements could include keywords from the test scripts, a summary from the test script, numbers that have been assigned to each script beforehand, or even the entire test script.

Accordingly, in the classification operation, the feature vector 150 is mapped to N elements of the label vector 502 in a multi-label classification operation. To perform the multi-label classification, a One-Vs-All (OVA) classification strategy is used, where the multi-label classification problem is decomposed to multiple single-label classification problems. By using the OVA strategy, several independent classifiers are built for each element of the label vector 502 (i.e., each of the test scripts). Each of the classifiers is fitted to each input in the data set to determine which labels it belongs to. The output of the classifier 500 is a vector 502 of N labels and a vector 504 of N prediction score values that indicate how relevant the associated test script is to the test case specification represented by the feature vector 150. In general, values of the prediction score above zero indicate a high degree of relevance. Thus, in some embodiments, test scripts corresponding to label vectors having a prediction score greater than zero may be selected for execution. The classifier 500 may identify none, one, or more than one of the test scripts as being relevant to the test case specification represented by the feature vector 150.

In some embodiments, a threshold value for the prediction score greater than zero may be used for determining what test cases to select. That is, by choosing a threshold for the prediction score that is greater than zero, there may be higher confidence that the model only selects test scripts that are highly relevant to the test case specification represented by the feature vector 150, thus potentially increasing confidence in the predictions. To choose the threshold, the prediction scores may be analyzed and a grid search with different values for the threshold implemented. In some implementations, a threshold value of 0.1 may yield the best results. A threshold value of the prediction score of 0.1 means that the classifier only selects the test scripts that have a prediction score over 0.1.

For each selected test script, some embodiments provide a confidence score, expressed as a percentage, that indicates how confident the system is that the selected test script is relevant to the given test case specification. The confidence score percentage may be calculated based on the prediction score and the threshold value described above. In some embodiments, all test scripts with a prediction score equal to or greater than the threshold value of 0.1 are considered to have a 100% confidence score. For the test scripts with a prediction score lower than the threshold value of 0.1, a confidence score may be calculated based on how close the scripts' prediction score is to the threshold in a normal distribution fashion.

To calculate the confidence score given the predication score, the following steps are performed. First, the standard deviation, σ, of the prediction scores of all test scripts in the data set is calculated. Next, the mean, μ, is set as the threshold value of 0.1. A normally distributed random variable is then generated by using the mean and standard deviation as parameters. A confidence score is then calculated as shown in Equation [1]:

$$CS(PS) = \begin{cases} 1, & PS \geq \text{threshold} \\ 2 * cdf(PS; \mu, \sigma), & PS < \text{theshold} \end{cases} \quad [1]$$

where CS is the confidence score, PS is the prediction score and cdf is the cumulative distribution function of the normally distributed random variable.

Once the prediction scores have been generated and the test scripts meeting or exceeding the prediction score threshold have been selected, some systems/methods may output an identification of the selected test scripts along with their associated confidence scores to a user via a user interface. In some embodiments, the selected test scripts may be automatically executed by the system to carry out a test according to the test case specification.

Figure 6:
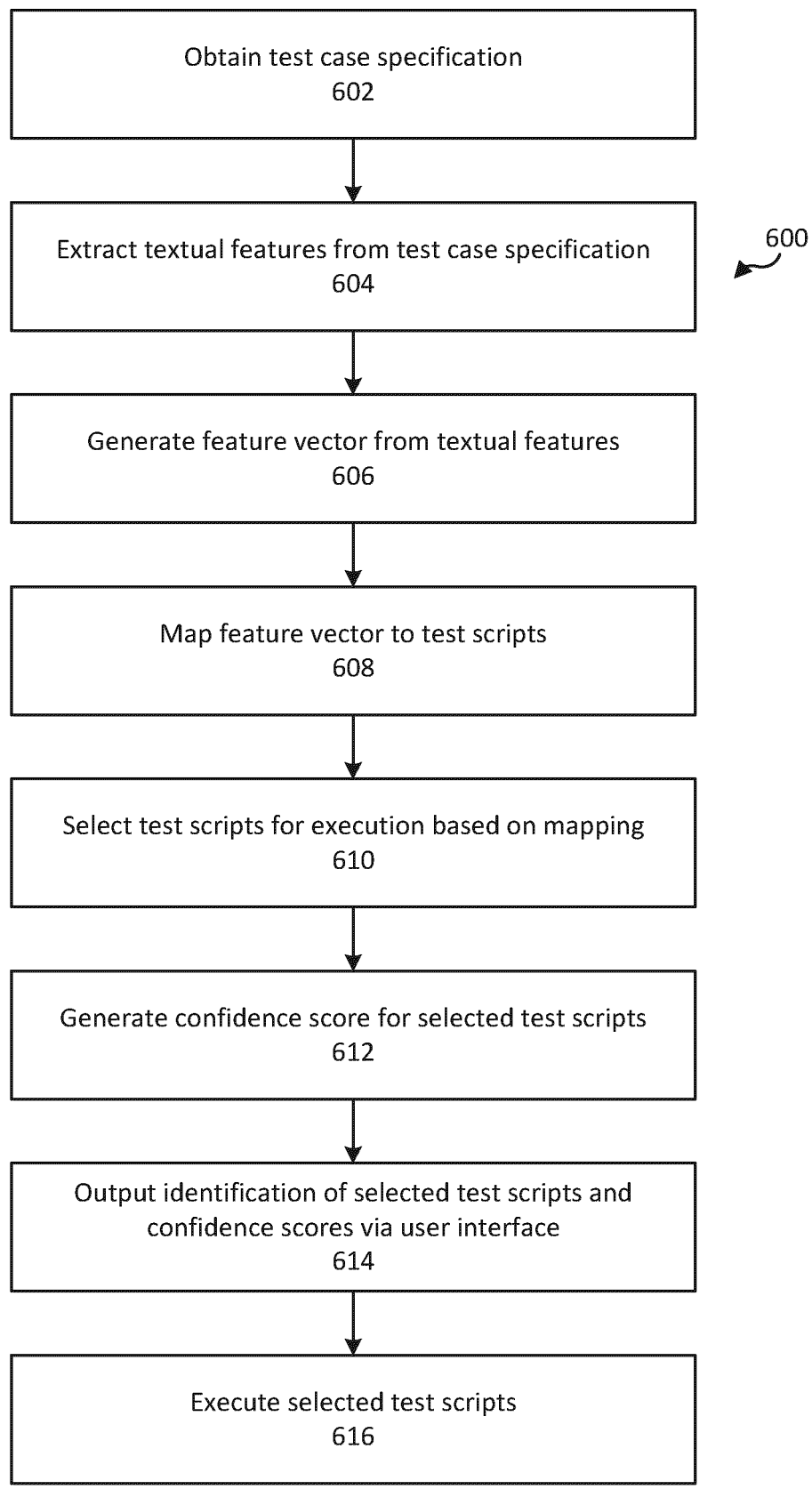
FIG. 6 is a flowchart of operations of systems/methods for automatically selecting test cases for testing communication systems/devices according to some embodiments.

FIG. 6 is a flowchart of operations of systems/methods according to some embodiments. Referring to FIG. 6, a method 600 of testing a network node in a communication system. The method 600 includes obtaining, at block 602, a test case specification that describes a test scenario associated with the network node. The test case specification may be written in a natural language, such as English. At block 604, the method extracts textual features from the test case specification. Extracting the textual features from the test script may include splitting the test case specification into a set of specification words, performing part of speech tagging on the words in the set of specification words, and removing stop words from the set of specification words.

At block 606, the method generates a feature vector comprising the extracted textual features from the test case specification, and at block 608, the method maps the feature vector to a plurality of available test scripts. Generating the feature vector may include selecting all verbs from the set of specification words and selecting all nouns and adjectives from the set of specification words that satisfy a selection criterion. The selection criterion may include a frequency of appearance within the set of specification words.

In some embodiments, the method may generate a plurality of augmented feature vectors from the feature vector, wherein the plurality of augmented feature vectors are generated as subsets of the feature vector, and training a classifier that is used to map the feature vector to the plurality of available test scripts using the plurality of augmented feature vectors.

Mapping the feature vector to the plurality of available test scripts may be performed by generating a label vector for each of the plurality of available test scripts and classifying the label vector using a text classifier. The label vector for each of the plurality of available test scripts may be obtained by generating, for each test script in the plurality of available test scripts, a vector of terms in the test script. Mapping the feature vector to the plurality of available test scripts may be performed by generating a label vector for each of the plurality of available test scripts and classifying the label vector using a text classifier. The label vector for each of the plurality of available test scripts may be obtained by generating, for each test script in the plurality of available test scripts, a vector of terms in the test script.

At block 610 the method selects one or more of the plurality of available test scripts for execution in response to the mapping of the feature vector. At block 612, for one or more of the selected test scripts the method generates a confidence score that measures a confidence of an association of the test case specification with the selected test script.

In some embodiments, the method may generate a prediction score associated with each of the plurality of available test scripts. The selection of one or more of the plurality of available test scripts for execution in response to the mapping of the feature vector may be performed based on the prediction score. The selection of the one or more of the plurality of available test scripts for execution in response to the mapping of the feature vector may be performed based on whether an associated prediction score is greater than a threshold value.

The confidence score for each of the selected test scripts may be generated based on the prediction score associated with each of the selected test scripts.

In some embodiments, the confidence score for each of the selected test scripts may be generated based on how close the prediction scores for the selected test script is to the threshold value in a normal distribution fashion.

Still referring to FIG. 6, in some embodiments, at block 614 the method outputs an identification of the selected test scripts and associated confidence scores via a user interface. In some embodiments the method includes receiving a user input in response to outputting the identification of the selected test scripts and executing the selected test scripts in response to the user inputs.

Classifier Training

As will be appreciated, the classifier 500 must be trained before it can be used to perform the multi-label classification operation described above.

Figure 7A:
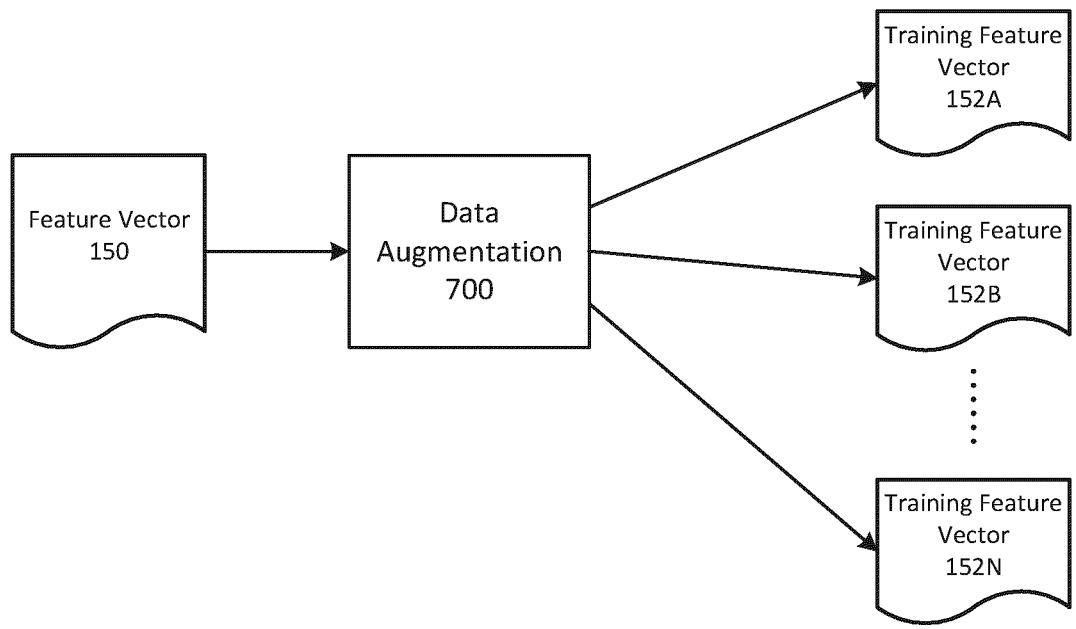
FIGS. 7A and 7B illustrate data augmentation for generating feature vectors for training a classifier according to some embodiments.

For training purposes, an input training dataset is obtained. The input training dataset includes a plurality of test case specifications and a library of test scripts associated with the test case specifications. Two arrays are then constructed, namely a Features array and a Labels array, where Features[i] contains the feature vector belonging to the i:th test case specification and Labels[i] contains the label vector belonging to the i:th test script. The Features array is used as input for the text classifier and Labels as the output. Data in the training and testing datasets may be encoded using one-hot-encoding to keep track of the labels in a numerically meaningful way. For example, each feature and label in the data set may be converted to either 1 or 0 depending on whether they belong to the test case specification or not To construct the Features array, it may be desirable to perform data augmentation to increase the size and variety of the input training dataset. Referring to FIG. 7A, data augmentation 700 may be performed by choosing elements from the power set of the feature vector 150, namely, the set of all subsets of the feature vector. Not all subsets may be selected and added to the training dataset. For example, in some embodiments, subsets containing only one word may be excluded. The newly generated training feature vectors 152A-152N are labeled with the same label as the vector they were generated from (i.e., the training feature vectors 152 are mapped to the same labels as the feature vector 150 was).

Figure 7B:
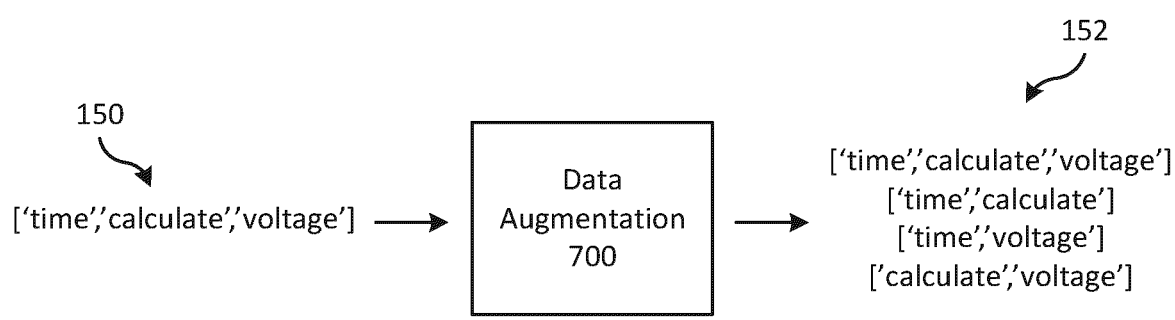

FIG. 7B illustrates an example of data augmentation in which the feature vector 150 (['time/calculate/voltage]) derived from a test case specification is expanded into a set of feature vectors 152 (['time','calculate','voltage'], ['time','calculate'], etc.). In this way, multiple new feature vectors are generated from an existing feature vector.

Once the Feature vector has been augmented, the input dataset is split into a training dataset and a test dataset. The training dataset is used to train the classifier 500, and the test dataset is used to validate the trained model. In some embodiments, a split of 65% training/35% test may be appropriate.

Example Embodiment

To evaluate the systems/methods described herein, data from the five communication products were split into training and testing sets in a stratified fashion. Test case specifications from three of the products (147 specifications) were used for training and the two-remaining product for testing (78 specifications), i.e. approximately 65% of the original dataset for training and 35% for testing. The reason for not splitting the data randomly is to avoid problems with missing labels. If the data were split randomly, there is a risk that some classes become missing from the training data set, which is a common problem when there is a low occurrence frequency of the classes. Missing some of the labels in the training set would be problematic, since the classifier would not be able to train with the missing labels and thus would not predict them for any instances.

Prediction scores corresponding to the labels were generated by manually mapping test case specifications in the input test dataset to labels corresponding to the teste scripts. In total, the mappings between 225 test case specifications and 72 C #test scripts were provided. Employing this information, a ground truth table was constructed, consisting of a matrix containing test case specifications as rows and C #test scripts as columns. A test script is marked with 1 in the matrix cell if it is mapped to the test case specification of that row and 0 otherwise. The number of negative elements in the data set (test scripts marked with 0) is much larger than the number of positive elements (test scripts marked with 1), resulting in an imbalanced data set. During the evaluation phase the number of true positives (TP), true negatives (TN), false positives (FP), and false negatives (FN) were calculated to be used for the calculation of different performance metrics as described below.

Two classifiers were applied to the vectors:LinearSVC and K-nearest neighbors (KNN). For LinearSVC, the regularization parameter C was set to 0.6. For KNN, two different values of K were used, 1 and 3, and the Sorensen-Dice distance function was used. The methodology that yielded the best results on the provided data set was to use LinearSVC as the classifier with data augmentation performed on the training set. However, some embodiments may advantageously use KNN or another classifier without departing from the scope of the inventive concepts.

Accuracy as a performance metric for imbalanced data sets can yield misleading results since accuracy apt to perform better on the majority class and poorly on the minority class. Therefore, it was decided to implement and use a balanced accuracy function adjusted for multi-label classification, where the number of true positive and true negative predictions are normalized by the number of positive and negative samples, respectively. The balanced accuracy function is calculated according to Equation [2]:

$$\text{Balanced Accuracy} = \frac{1}{2}\left(\frac{TP}{TP+FN} + \frac{TN}{TN+FP}\right) \quad [2]$$

Additionally, Precision, Recall, and F1 score are also calculated and used to measure the performance of the proposed approach since these metrics put more weight on the true positive predictions which were considered to be of most importance. The precision equation [3] denotes the number of correctly predicted C #scripts divided by the total number of C #scripts predicted by the proposed approach. This indicates how many of the selected items are relevant. The Recall equation [4] is the number of correctly predicted C #scripts divided by the total number of existing C #scripts in the ground truth. This indicates how many of the relevant items are selected. F1-score, Equation [5], is a harmonic mean between Precision and Recall.

$$\text{Precision} = \frac{TP}{TP+FP} \quad [3]$$

$$\text{Recall} = \frac{TP}{TP+FN} \quad [4]$$

$$F1 = 2\frac{\text{Precision} \cdot \text{Recall}}{\text{Precision}+\text{Recall}} \quad [5]$$

Figure 8:
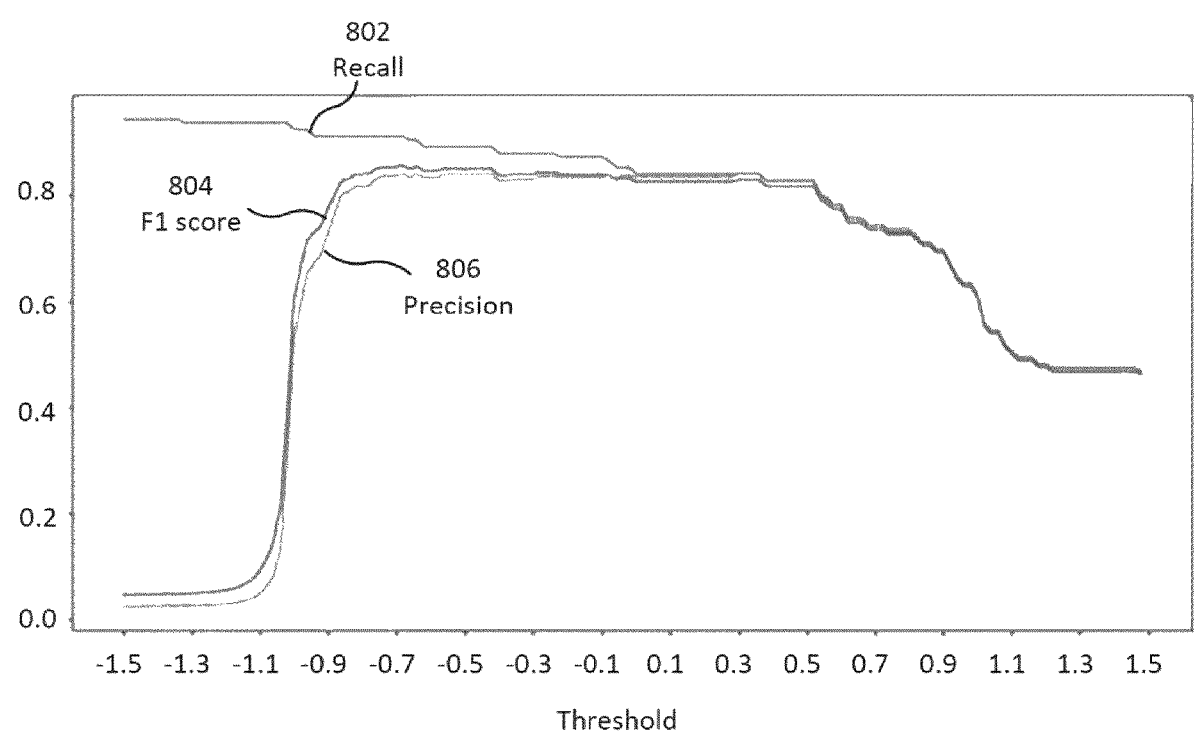
FIG. 8 is a graph of Recall, F1 score and Precision for an example embodiment.

The machine learning model was trained with three products, containing 147 test case specifications and 72 C #test scripts, and tested on the remaining two products with 78 test case specification. The performance of the proposed approach is measured by calculating Precision, Recall, F1 score, and balanced Accuracy on the test set. Employing the mentioned equations can help us to evaluate the systems/methods described herein. In this regard, different threshold boundaries are analyzed. FIG. 8 is a graph showing the obtained results for the precision (curve 806), recall (curve 802) and F1 score (curve 804).

As can be seen in FIG. 8, the highest value for F1 score=83.80% is obtained when the threshold is set to 0.1, where the precision score is: 84.62% and the recall score is: 85.26%, respectively. Moreover, the balanced accuracy which is measured as the average of the proportion corrects of each class individually is equal to 92% in this case.

Figure 9:
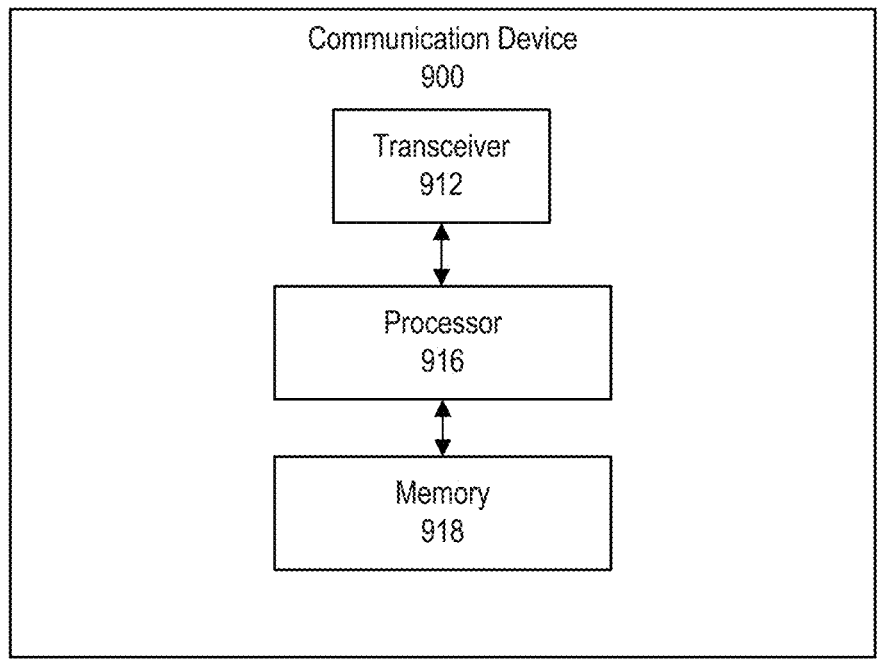
FIG. 9 is a block diagram of a communication device that may be tested by systems/methods according to some embodiments.

FIG. 9 depicts an example of a communication device 900 of a wireless communication network that may be tested according to embodiments of inventive concepts. As shown, the communication device 900 may include a transceiver circuit 912 (also referred to as a transceiver) including a transmitter and a receiver configured to provide uplink and downlink radio communications with wireless devices. The communication device 900 may also include a processor circuit 916 (also referred to as a processor) coupled to the transceiver circuit 912, and a memory circuit 918 (also referred to as memory) coupled to the processor circuit 916. The memory circuit 918 may include computer readable program code that when executed by the processor circuit 916 causes the processor circuit to perform various operations. According to other embodiments, processor circuit 916 may be defined to include memory so that a separate memory circuit is not required.

Figure 10:
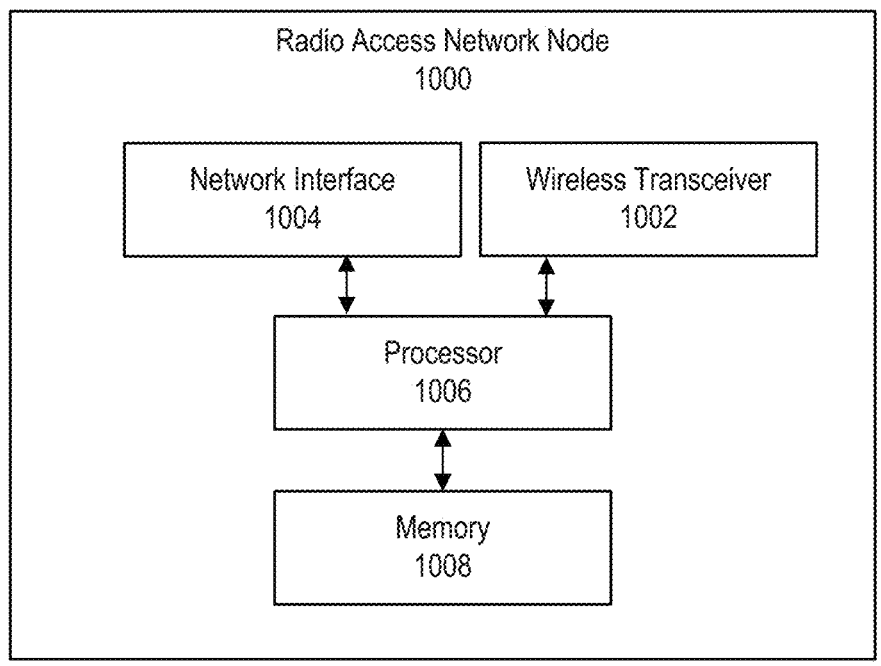
FIG. 10 is a block diagram of a communication device that may be tested by systems/methods according to some embodiments.

FIG. 10 depicts an example of a radio access network node 1000 of a wireless communication network that may be tested according to embodiments of inventive concepts. The network node 1000 may include a network interface circuit 1004 (also referred to as a network interface) configured to provide communications with other nodes (e.g., with other base stations and/or core network nodes) of the wireless communication network. The network node 1000 may further include a wireless transceiver 1002 for performing wireless communications with a communication device 900. The memory circuit 1008 may include computer readable program code that when executed by the processor circuit 1006 causes the processor circuit to perform various operations. According to other embodiments, processor circuit 1006 may be defined to include memory so that a separate memory circuit is not required.

Figure 11:
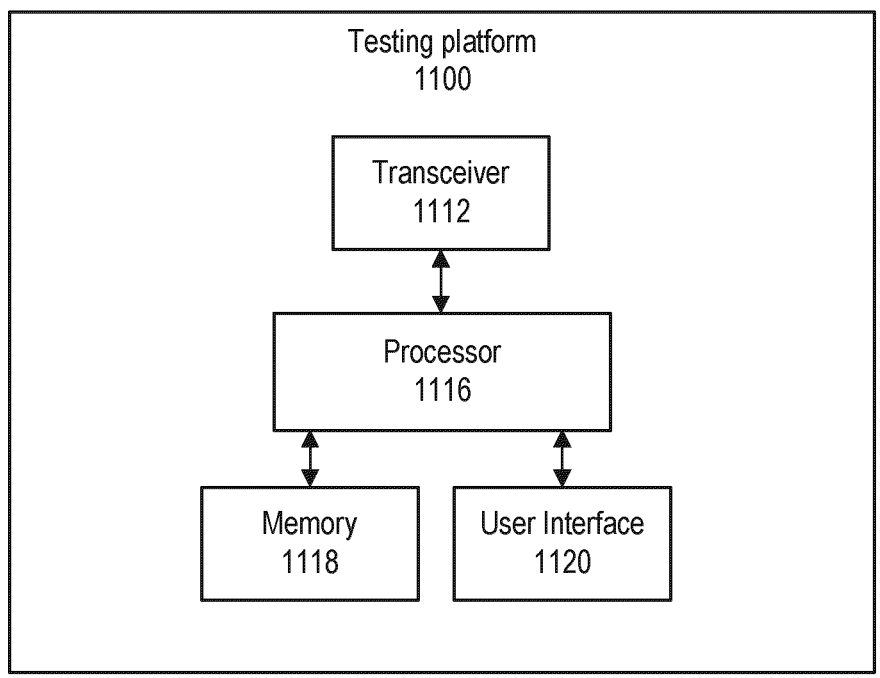
FIG. 11 is a block diagram of a computing system for selecting test scripts for execution according to some embodiments.

FIG. 11 depicts an example of a testing system 1100 that may select test scripts for execution according to embodiments of inventive concepts. As shown, the testing platform 1100 may include a transceiver circuit 1112 (also referred to as a transceiver) including a transmitter and a receiver configured to provide uplink and downlink communications with communication devices. The testing platform 1100 may also include a processor circuit 1116 (also referred to as a processor) coupled to the transceiver circuit 1112, and a memory circuit 1118 (also referred to as memory) coupled to the processor circuit 1116. The memory circuit 1118 may include computer readable program code that when executed by the processor circuit 1116 causes the processor circuit to perform operations according to embodiments disclosed herein. According to other embodiments, processor circuit 1116 may be defined to include memory so that a separate memory circuit is not required.

As discussed herein, operations of the testing platform 1100 may be performed by processor 1116. Moreover, modules may be stored in memory 1118, and these modules may provide instructions so that when instructions of a module are executed by processor 1116, processor 1116 performs respective operations (e.g., operations discussed above with respect to example embodiments).

Accordingly, a testing platform 1100 according to some embodiments includes a processor circuit 1116, a transceiver 1112 coupled to the processor circuit, and a memory 1118 coupled to the processor circuit, the memory including machine readable program instructions that, when executed by the processor circuit, cause the testing platform 1100 to perform operations described above. The testing platform further includes a user interface 1120 coupled to the processor circuit 1116.

Explanation of Abbreviations

NLP Natural Language Processing
STLC Software Testing Life Cycle
NLTK Natural Language Toolkit
POS Part-of-Speech
SME Subject-Matter Expert
AI Artificial Intelligence
OVA One-Vs-All
LinearSVC Linear Support Vector Classifier
KNN K-Nearest Neighbors
GUI Graphical User Interface Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, a "communication device" may be any device intended for accessing services via an access network and configured to communicate over the access network. For instance, the communication device may be, but is not limited to: a user equipment (UE), mobile phone, smart phone, sensor device, meter, vehicle, household appliance, medical appliance, media player, camera, or any type of consumer electronic, for instance, but not limited to, television, radio, lighting arrangement, tablet computer, laptop, or PC. The communication device may be a portable, pocketstorable, hand-held, computer-comprised, or vehicle-mounted mobile device, enabled to communicate voice and/or data, via a wireless or wireline connection.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components, or functions but does not preclude the presence or addition of one or more other features, integers, elements, steps, components, functions, or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of testing a network node in a communication system, comprising:
   obtaining a test case specification that describes a test scenario associated with the network node;
   extracting textual features from the test case specification;
   generating a feature vector comprising the extracted textual features from the test case specification;
   mapping the feature vector to a plurality of available test scripts;
   generating a plurality of augmented feature vectors from the feature vector, wherein the plurality of augmented feature vectors are generated as subsets of the feature vector;
   training a classifier that is used to map the feature vector to the plurality of available test scripts using the plurality of augmented feature vectors;
   selecting one or more of the plurality of available test scripts for execution in response to the mapping of the feature vector; and
   for one or more of the selected test scripts, generating a confidence score that measures a confidence of an association of the test case specification with the selected test script.

2. The method of claim 1, further comprising:
   outputting an identification of the selected test scripts and associated confidence scores via a user interface.

3. The method of claim 1, wherein extracting the textual features from the test script comprises:
   splitting the test case specification into a set of specification words;
   performing part of speech tagging on the words in the set of specification words; and
   removing stop words from the set of specification words.

4. The method of claim 3, wherein generating the feature vector comprises:
   selecting all verbs from the set of specification words; and
   selecting all nouns and adjectives from the set of specification words that satisfy a selection criterion.

5. The method of claim 4, wherein the selection criterion comprises a frequency of appearance within the set of specification words.

6. The method of claim 1, wherein mapping the feature vector to plurality of available test scripts comprises:
   generating a label vector for each of the plurality of available test scripts; and
   classifying the label vector using a text classifier.

7. The method of claim 6, wherein generating the label vector for each of the plurality of available test scripts comprises generating, for each test script in the plurality of available test scripts, a vector of terms in the test script.

8. The method of claim 6, wherein the text classifier comprises a K-nearest neighbors classifier or a support vector machine classifier.

9. The method of claim 6, wherein classifying the label vector is performed using a one-vs-all classification strategy.

10. The method of claim 1, further comprising:
    generating a prediction score associated with each of the plurality of available test scripts, wherein selecting one or more of the plurality of available test scripts for execution in response to the mapping of the feature vector is performed based on the prediction score.

11. The method of claim 10, wherein selection of the one or more of the plurality of available test scripts for execution in response to the mapping of the feature vector is performed based on whether an associated prediction score is greater than a threshold value.

12. The method of claim 10, wherein the confidence score for each of the selected test scripts is generated based on the prediction score associated with each of the selected test scripts.

13. The method of claim 12, wherein the confidence score for each of the selected test scripts is generated based on how close the prediction scores for the selected test script is to a threshold value in a normal distribution fashion.

14. The method of claim 2, further comprising:
    receiving a user input in response to outputting the identification of the selected test scripts; and
    executing the selected test scripts in response to the user inputs.

15. The method of claim 1, wherein the test case specification is written in natural language.

16. A system for testing a network node in a communication system, comprising:
    a processor circuit; and
    a memory coupled to the processor circuit, wherein the memory comprises computer program instructions that, when executed by the processor circuit cause the system to perform operations comprising:

obtaining a test case specification that describes a test scenario associated with the network node;

extracting textual features from the test case specification;

generating a feature vector comprising the extracted textual features from the test case specification;

mapping the feature vector to a plurality of available test scripts;

generating a plurality of augmented feature vectors from the feature vector, wherein the plurality of augmented feature vectors are generated as subsets of the feature vector;

training a classifier that is used to map the feature vector to the plurality of available test scripts using the plurality of augmented feature vectors;

selecting one or more of the plurality of available test scripts for execution in response to the mapping of the feature vector; and for one or more of the selected test scripts, generating a confidence score that measures a confidence of an association of the test case specification with the selected test script.

17. The system of claim 16, wherein the system is further configured to perform operations comprising:

outputting an identification of the selected test scripts and associated confidence scores via a user interface.

18. The system of claim 17, wherein the system is further configured to perform operations comprising:

receiving a user input in response to outputting the identification of the selected test scripts; and executing the selected test scripts in response to the user inputs.

19. The system of claim 16, wherein extracting the textual features from the test script comprises:

splitting the test case specification into a set of specification words;

performing part of speech tagging on the words in the set of specification words; and removing stop words from the set of specification words.

20. The system of claim 17, wherein mapping the feature vector to plurality of available test scripts comprises:

generating a label vector for each of the plurality of available test scripts; and classifying the label vector using a text classifier.

* * * * *